United States Patent
Metin et al.

(10) Patent No.: US 7,136,351 B2
(45) Date of Patent: Nov. 14, 2006

(54) SWITCHED ETHERNET NETWORKS

(75) Inventors: Feridun Metin, Thalwil (CH); Sean Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 09/873,454

(22) Filed: Jun. 4, 2001

(65) Prior Publication Data
US 2002/0031142 A1    Mar. 14, 2002

(51) Int. Cl.
  *G01R 31/08* (2006.01)
  *H04L 12/28* (2006.01)
(52) U.S. Cl. .............. 370/230; 370/401; 370/395.21; 370/395.43
(58) Field of Classification Search .............. None
  See application file for complete search history.

(56) References Cited
U.S. PATENT DOCUMENTS 5,812,552 A * 9/1998 Arora et al. ........... 370/395.53
6,085,238 A * 7/2000 Yuasa et al. ............. 709/223
6,122,252 A * 9/2000 Aimoto et al. ........... 370/235
6,882,856 B1 * 4/2005 Alterman et al. .......... 455/519

* cited by examiner

Primary Examiner—Chau Nguyen
Assistant Examiner—Cynthia L. Davis
(74) Attorney, Agent, or Firm—Douglas W. Cameron; Ann Vachon Dougherty

(57) ABSTRACT

Methods and apparatus are provided for managing data communications between hosts (9) of a switched Ethernet network (8). Hosts (9) are assigned to logical groups of hosts such that the hosts participating in a data communication are assigned to the same group. In a switch (1) of the network, each group is associated with a service class indicative of requirements for forwarding data across the switch (1) for data communications between hosts (9) in that group. Data received by the switch (1) is forwarded across the switch in a manner dependent on the service class of the group to which hosts (9) participating in the data communication are assigned. In the switch (1), data communications between hosts (9) in one or more of said groups are disabled when required to satisfy the forwarding requirements for at least one said service class.

19 Claims, 4 Drawing Sheets

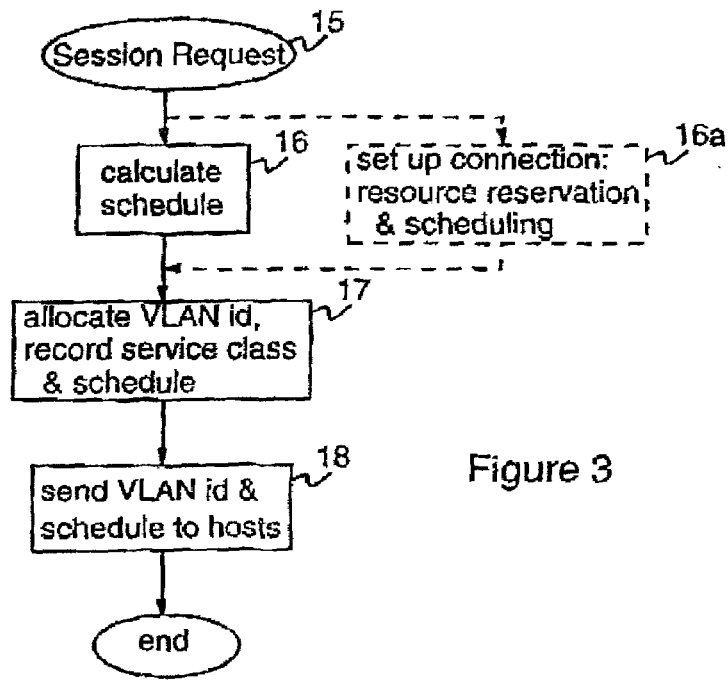
Figure 3
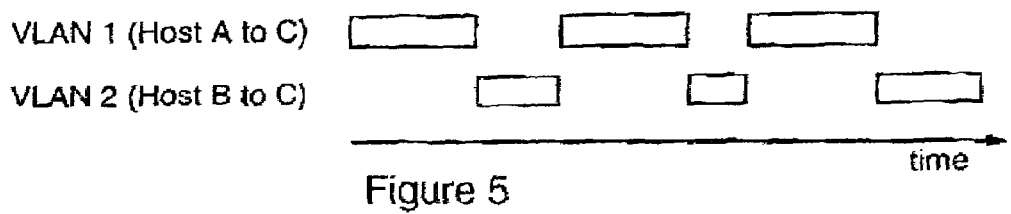
Figure 4
Figure 5

SWITCHED ETHERNET NETWORKS

FIELD OF THE INVENTION

This invention relates generally to switched Ethernet networks, and more particularly to provision of Quality of Service (QoS) mechanisms in these networks. Particular embodiments of the invention provide methods for managing data communications in such networks to support guaranteed QoS, and to Ethernet switches and network systems for implementing these methods.

BACKGROUND OF THE INVENTION

Ethernet is the predominant network technology in the local area network (LAN) market, driven by its relatively low cost in comparison with other competeing technologies. Although technologies such as ATM (Asynchronous Transfer Mode) have been proposed as the network technology for support of multimedia to desktop, the large installed base of 10Mbps Ethernet networks, the rapid proliferation of of 10/100Mbps Ethernet (Fast Ethernet) and the emerging Gigabit Ethernet technologies suggest that Ethernet will be the underlying technology for supporting real-time, continuous media services to the desktop. With increasing interest in IP (Internet Protocol) telephony services, first by the information technology sector and now by telecommunications companies, demand for commercial products supporting continuous media to the desktop is to be expected.

Ethernet has evolved as a shared media technology without support for QoS facilities that are available on ATM networks, i.e. resource guarantees for services through bandwidth and buffer allocation. Recently, however, IEEE 802.1 Higher Layer LAN Protocols Working Group has introduced the IEEE 802.1p specification where switches and hubs can prioritize traffic classes. Implementation of 802.1p requires extensions to the Ethernet frame format in order to support priority tagging for differentiating between different traffic classes according to some set policy within the switch. This, together with mechanisms which allow the implementation of Virtual Bridged LANs (VLANs), is discussed in the IEEE 802.1Q specification. Briefly, hosts can indicate the priority to be afforded to data communications by indicating a user-priority value in a user-priority field of the data packet, or frame, format. This user-priority is utilized by the forwarding process of the switch which is responsible for forwarding received frames across the switch onto the appropriate outbound LAN segment. Specifically, the user-priority value is mapped to one of a number of traffic classes defined in the switch. The requirements for forwarding a received frame across the switch are indicated to the forwarding process by the traffic class, the forwarding process selecting frames for forwarding in an order dependent on the traffic class. As a simple example, a switch may support eight traffic classes which correspond directly to eight user-priority values, and the forwarding process may forward all received frames in the highest traffic class before forwarding frames in the next-highest traffic class, and so on down through the traffic classes. Clearly, the architectures of switches and network interface cards must be modified for implementation of this system.

The IEEE specifications referenced above describe operation of the prioritized traffic class system at the network level. The IETF (Internet Engineering Task Force) Internet Draft entitled "A Framework for Integrated Services Over Shared and Switched IEEE 802 LAN Technologies", (draft-ietf-issll-is802-framework-07.txt), June 1999 discusses mechanisms for supporting QoS at the IP level and how these might interface with existing Ethernet systems.

While the prioritized traffic class system provides a basic mechanism for supporting different quality of service levels, the system does not provide any QoS guarantees. In particular, if there are hosts deliberately or inadvertently generating traffic in a manner that undermines the policies in place for allocating network bandwidth between different traffic classes, then QoS cannot be guaranteed. For example, if buffers at a switch port become congested, then the MAC (Media Access Control) entity at the port will jam the connected LAN segment, blocking transmissions from all hosts on that segment via the standard CSMA/CD (Carrier Sense Multiple Access with Collision Detection) mechanism. Thus, hosts transmitting high-priority data can be penalized equally with hosts transmitting low-priority data, so that QoS cannot be guaranteed even for high-priority data.

According to a first aspect of the present invention there is provided a method for managing data communications between hosts of a switched Ethernet network, the method comprising:

assigning hosts to logical groups of hosts such that the hosts participating in a data communication are assigned to the same group;

in a switch of the network, associating each said group with a service class indicative of requirements for forwarding data across the switch for data communications between hosts in the group, and forwarding received data across the switch in a manner dependent on the service class of the group to which hosts participating in the data communication are assigned; and in the switch, disabling data communications between hosts in one or more of said groups when required to satisfy the forwarding requirements for at least one said service class

SUMMARY OF THE INVENTION

In embodiments of the present invention, therefore, the hosts participating in a given data communication, i.e., the transmitting and receiving hosts, are assigned to a logical group. Within the switch, each group is associated with a service class, or QoS class, for which the forwarding requirements are defined, whereby the switch forwards data corresponding to a particular service class in accordance with those requirements. However, when necessary to endure that the switch can continue to meet the forwarding requirements of at least one service class, the switch can disable data communications for one or more host groups as appropriate, effectively deactivating those groups. As a simple example, if the ability of the switch to service communications at a required rate for a particularly important service class becomes compromised due to excess traffic of a less important service class, the switch could deactivate the group(s) corresponding to the less important class to endure that the required QoS is preserved for traffic in the more important class. As a further example, the minimum rate at which communications must be served for each service class could be defined, and the switch could deactivate any groups generating excess traffic as required to ensure that the minimum service rate can be met for all service classes. Whatever the particular system employed, since the switch can deactivate specific host groups, only hosts in those particular groups are penalized and not an arbitrary set of hosts in a particular LAN segment as in the existing system discussed above. This facility for deactivating host groups as necessary to ensure service requirements can be met thus allows QoS to be guaranteed for one or more service classes as desired for a given implementation.

The disabling of data communications for a particular host group could be performed by the switch in various ways. For example, embodiments can be envisaged where an instruction or control signal is sent to hosts to indicate that communications should cease until further notice. As a further example, for particular cases where the transmitting host of a group is the sole host on a particular segment, the switch could simply employ the usual CSMA/CD-enabled backflow mechanism to jam the segment. In preferred embodiments, however, the deactivation of a group is simply performed by discarding, or "dropping", data from hosts in the group on receipt by the switch.

The assignment of hosts to particular logical groups may be performed in various ways in the system. For example, some or all groups may be predefined in the system based on operator input. Here, an operator can assign particular hosts to particular groups based on the nature of the data to be communicated between the hosts. Alternatively, for some or all groups the assignment of hosts to particular groups could be performed dynamically by the switch based on he nature of the data to be communicated and/or session information supplied by a host during a set-up process for a particular data communications session. The logical groups themselves can be defined in the system in a number of way& As a simple example, the groups could be defined simply by storing separate lists of host ids demarcating the separate groups and their membership, whereby the switch determines the host group to which a particular data packet belongs by checking the source and destination host ids in the packet against the various lists. Conveniently, however, a group identifier is defined for each group, the assignment of hosts to a particular group being performed by allocating a group identifier to hosts in that group. Again this allocation could be performed by an operator via console input or may be performed dynamically by the switch. The group identifier to be used for particular communications could be supplied to the hosts themselves and inserted by the hosts in data packets destined for other hosts in the group. For example, hosts could be preconfigured by an operator to use a particular group identifier for communications within a specific host group. Alternatively, the group identifier may be supplied by the switch to hosts wishing to participate in a particular communications session, and inserted by those hosts in all packets relating to that session. As a further alternative, the group identifier may not be communicated to the hosts themselves, but simply inserted by the switch in packets transmitted between hosts in the group to facilitate processing by devices downstream in the network.

However the groups themselves are defined in the system, within the switch each group is associated with a particular service class which determines how traffic between hosts in the group is processed by the switch. The association between groups and service classes can be defined in the switch by storing data associating the group ids with particular service classes, for example in a lookup table. Again, this data can be stored by the switch in response to operator input for some or all groups, or may be stored automatically by the switch in response to dynamic allocation of a group id for example.

The service class associated with a given group indicates the requirements which must be observed by the switch for forwarding traffic for that host group. Any number of service class systems can be envisaged here. As one simple example, a high-priority service class and a low-priority service class may be defined in the switch, and forwarding of received data corresponding to the high-priority class may be given precedence over forwarding of data corresponding to the low-priority class. Different minimum required forwarding rates could be defined for each service class according to the bandwidth required for traffic in groups associated with the two classes. If the switch's ability to meet the forwarding requirements for either class is threatened due to excess traffic (as identified for example when the switch buffers reach a certain level of congestion or when bus traffic reaches a certain level), then the appropriate group(s) can be deactivated to ensure the forwarding requirements of one or both groups can be met. In another scenario, groups associated with the low-priority service class could simply be deactivated if necessary to satisfy the forwarding requirements for the high-priority service class. A similar system could be employed for multiple service classes each having a different priority, the switch deactivating groups associated with one or more low-priority service classes as required to ensure the forwarding requirements can be met for one or more higher-priority service classes. In a particular example described in detail below, scheduling may be employed for a high-priority service class, whereby individual groups involved in high-priority communications are assigned transmission schedules such that data received from a group during the assigned time periods will be forwarded by the switch with high-priority. If the switch becomes congested due to excess traffic outside the scheduled time period for a group, then the switch can deactivate that group outside its scheduled time periods to ensure that scheduled transmissions from all groups associated with the high-priority service class can be dealt with. In this case, for example, a low-priority service class could be defined as a "best-effort" class, whereby Ethernet hosts using standard best-effort transmissions can be assigned to a group associated with the low-priority service class.

While the logical grouping of hosts can be implemented in various ways as described in general above, preferred embodiments of the invention make use of VLAN technology for the logical groups, whereby each logical group comprises a VLAN and the assignment of transmitting and receiving hosts to a group comprises allocating a VLAN id to those hosts.

A second aspect of the present invention provides a switch for connection in a switched Ethernet network, the switch comprising:

switching circuitry for forwarding across the switch of data received at a port of the switch;

memory for storing data indicative of an assignment of hosts in the network to logical groups of hosts, said assignment being such that the hosts participating in a data communication are assigned to the same group; and control logic for associating each said group with a service class indicative of requirements for forwarding data across the switch for data communications between hosts in the group, and for controlling forwarding of received data by the switching circuitry in a manner dependent on the service class of the group to which hosts participating in the data communication are assigned;

wherein the control logic is configured to disable data communications between hosts in one or more of said groups when required to satisfy the forwarding requirements for at least one said service class.

A third aspect of the invention provides a switched Ethernet network including at least one switch as described above.

It is to be understood that the term "switch" is used herein in the general sense of any type of switch, switching hub, bridge or other switching device employed to switch traffic in a switched Ethernet network. Similarly, a "host" may be any type of network device or station connected in a segment of the network, such as workstations, PCs, printers, etc. Moreover, it is to be understood that, in general, where features are described herein with reference to a method embodying the invention, corresponding features may be provided in apparatus embodying the invention, and vice versa.

Another aspect of the invention provides a computer program element comprising computer program code means which, when loaded in a processor of a switch for connection in a switched Ethernet network, configures the processor to perform a method as described above. A further aspect of the invention provides a computer program element comprising computer program code means which, when loaded in a processor of a switch for connection in a switched Ethernet network wherein hosts of the network are assigned to logical groups of hosts such that the hosts participating in a data communication are assigned to the same group, configures the processor to:

associate each said group with a service class indicative of requirements for forwarding data across the switch for data communications between hosts in the group, and to control forwarding of received data across the switch in a manner dependent on the service class of the group to which hosts participating in the data communication are assigned; and to disable data communications between hosts in one or more of said groups when required to satisfy the forwarding requirements for at least one said service class.

BRIEF DESCRIPTION OF THE DRAWINGS

Preferred embodiments of the invention will now be described, by way of example, with reference to the accompanying drawings in which:

FIG. 3 is a flow chart illustrating a set up procedure for a communications session in the network of FIG. 2;

FIG. 4 illustrates the association of group ids and service classes in an example of operation of the network of FIG. 2;

FIG. 5 illustrates the scheduling of groups for the example of FIG. 4;

DETAILED DESCRIPTION OF THE INVENTION

Figure 1:
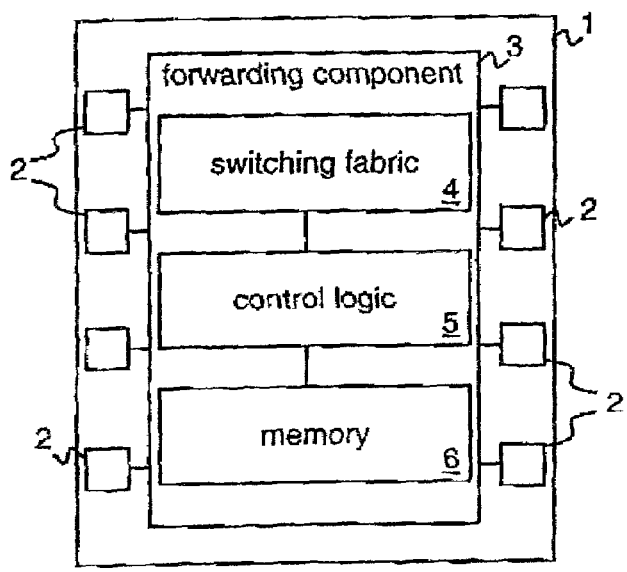
FIG. 1 is schematic diagram of an Ethernet switch for implementing embodiments of the invention.

FIG. 1 is a generalized schematic of an Ethernet switch 1 showing the main elements involved in operation of embodiments of the invention. For the purposes of this description, the switch 1 can be considered to comprises a plurality of ports 2 (eight being shown here) to which LAN segments can be connected in the usual way, and a forwarding component indicated generally at 3. The forwarding component 3 serves to forward data received at a switch port 2 across the switch onto the requires LAN segment via the appropriate outbound port 2. The forwarding component 3 is illustrated here as comprising switching fabric 4, control logic 5 and memory 6. The switching fabric 4 here comprises switching circuitry providing the physical mechanism via which data is transmitted across the switch, typically a shared bus or switching-matrix structure of known form. The control logic 5 controls operation of the forwarding component generally, and performs the functions described in detail below for managing data communications to support QoS guarantees. In general, control logic 5 may be implemented in hardware of software, or a combination thereof, though the control logic will typically be implemented by a processor running software which configures the processor to perform the functions described, and suitable software will be apparent to those skilled in the art from the description herein. (Of course, while the switch processor may be preconfigured with appropriate software, the program code constituting such software could be supplied separately for loading in the switch to configure the processor to operate as described. The program code could be supplied as an independent element or as an element of the program code for a number of control functions, and may be supplied embodied in a computer-readable medium or transmitted electronically to an operation, e.g., by downloading from an Internet site, for loading in the switch). Memory 6 represents generally the storage provided in the switch for both data received from network hosts to be forwarded across the switch, and data used in the control and management functions performed by control logic 5. Thus, while memory 6 is illustrated for simplicity as a single entity, it will be apparent to those skilled in the art that there will generally be various input and/or output buffers associated with each switch port 2 for storage of data in transit between hosts, as well as working memory associated with control logic 5.

In a switch 1 embodying the invention, the transmitting and receiving hosts involved in particular data communications are assigned to logical groups represented by VLANs defined in the system. VLAN technology is a well known technology which facilitates administration of groups of hosts such that hosts can effectively communicate as if they were on the same LAN. The general mechanisms that allow implementation of VLANs in switched Ethernet networks are discussed in the IEEE 802.1 Q specification referenced earlier, and need not be discussed in detail here. Embodiments of the present invention make use of this technology for defining the groups of transmitting and receiving hosts which are then managed in a particular manner to provide support for QoS guarantees. In particular, within a switch 1 embodying the invention, each VLAN is associated with a QoS class defined in the switch. The QoS class determines the requirements for forwarding of data from VLANs in that class by forwarding component 3 under control of control logic 5. Data received from hosts in a given VLAN is then forwarded by the switch in accordance with the QoS class requirements. However, if the control logic determines (by means of a monitoring process discussed further below) that the ability to meet the forwarding requirements for data of a given QoS class is prejudiced in operation, then the control logic can deactivate one or more VLANS as necessary to maintain the required service level. A particular example of this system will now be described with reference to FIGS. 2 to 8.

Figure 2:
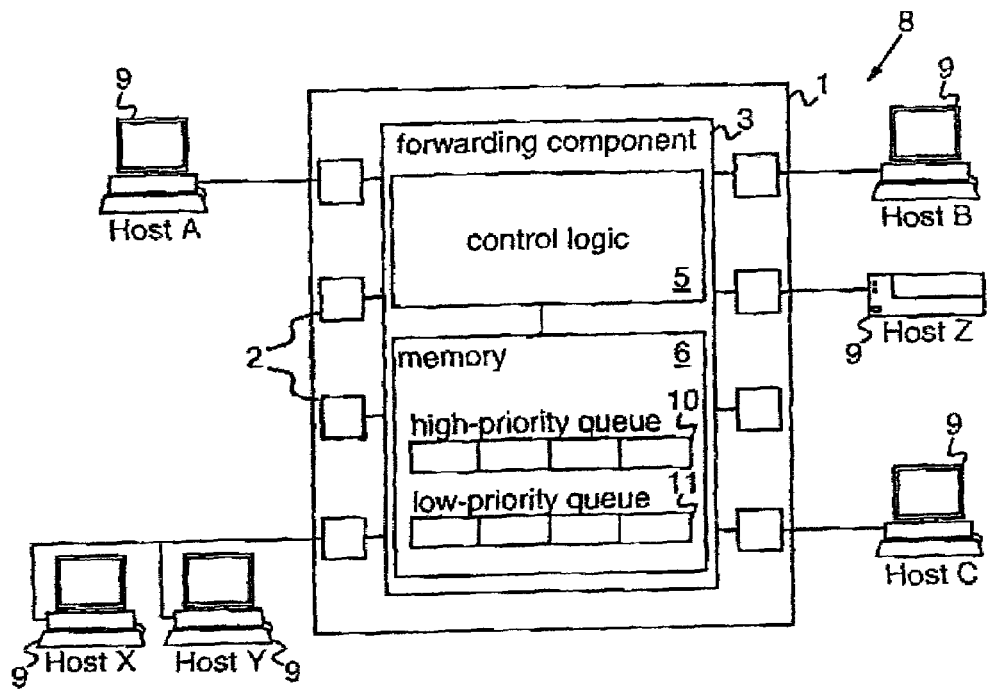
FIG. 2 is a schematic diagram of a simple network embodying the invention.
Figure 6:
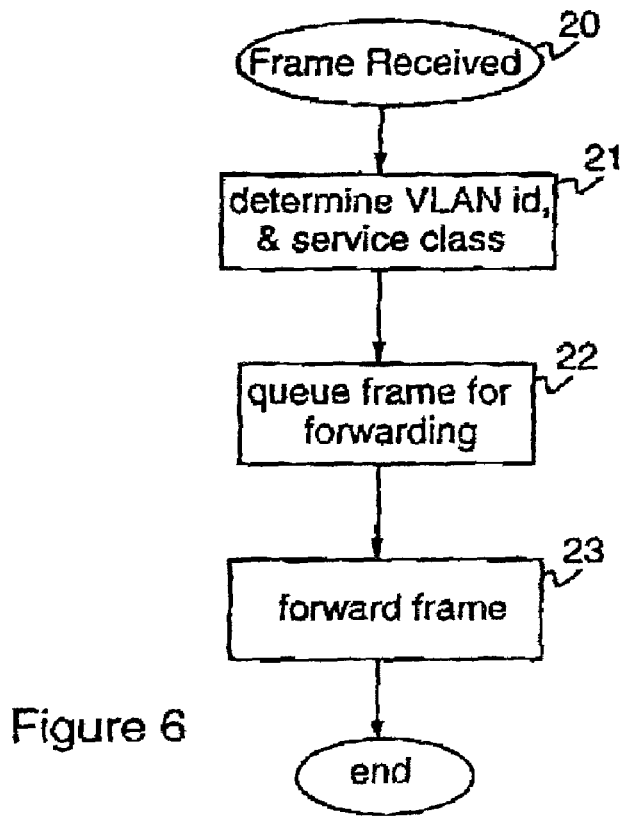
FIG. 6 is a flow chart illustrating the frame forwarding operation performed by the switch.
Figure 7:
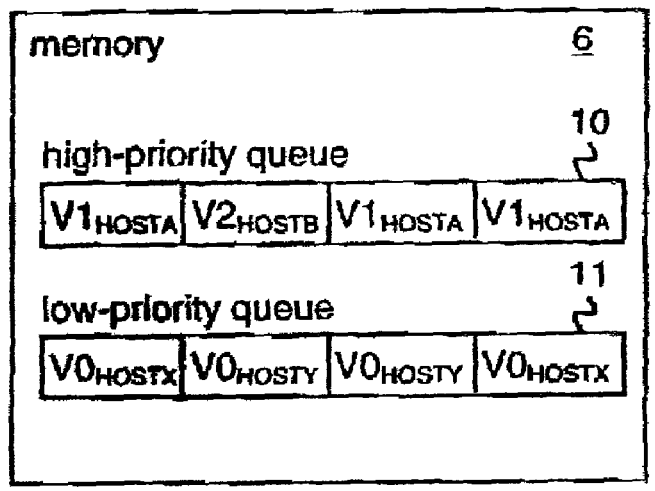
FIG. 7 illustrates a congested situation of the switch in operation.
Figure 8:
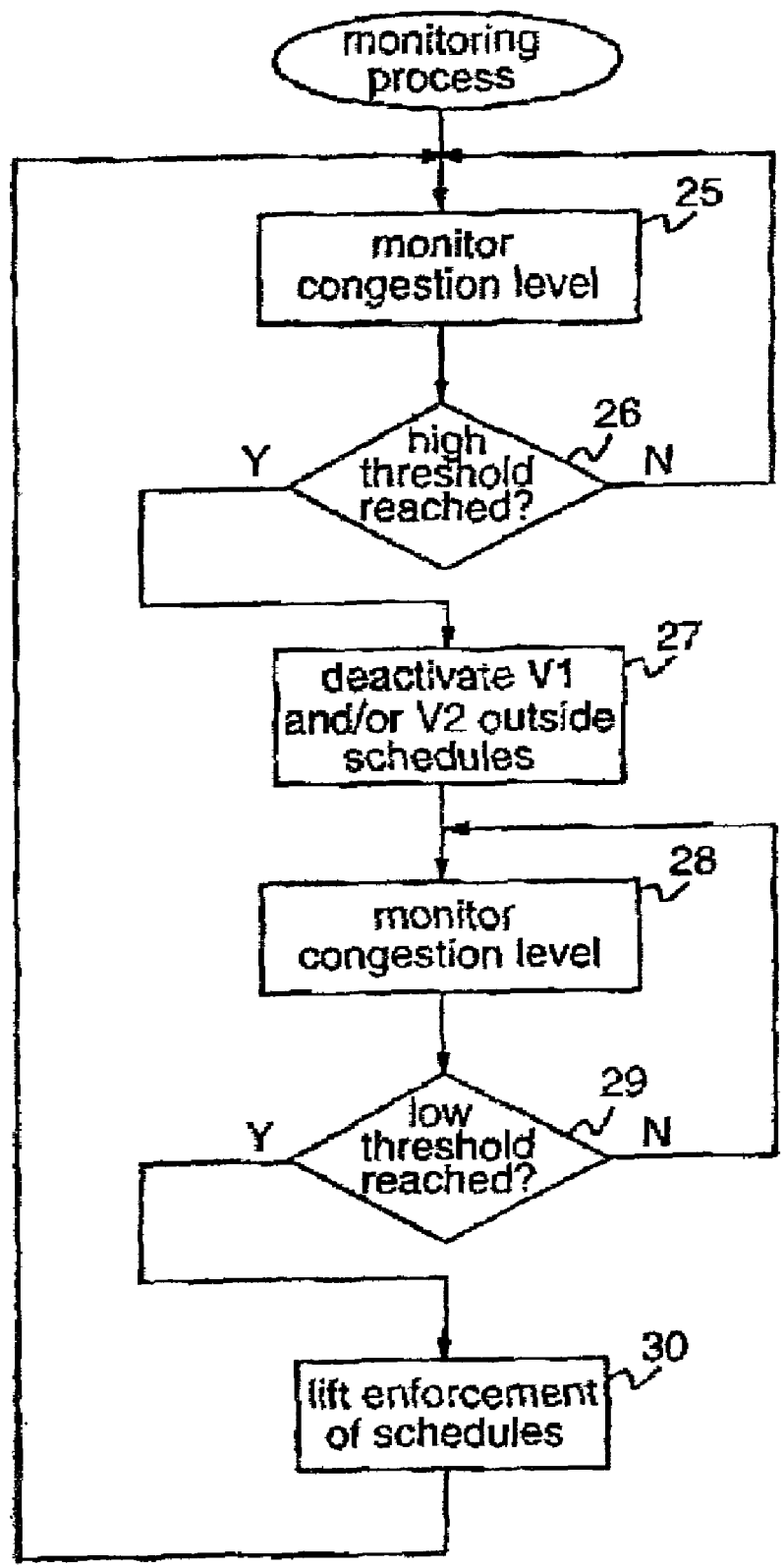
FIG. 8 is a flow chart illustrating a monitoring process performed by the switch in operation.

FIG. 2 shows a simple switched network 8 embodying the invention. The network 8 consists of a switch 1 as described above (switching fabric 4 being omitted in this figure for clarity), and six hosts 9, labeled A to C and X to Z, connected to the switch ports 2 as shown. For the purposes of this example, we assume that hosts A, B and C are configured for use of continuous media services (video-conferencing, IP telephony etc.). These hosts are directly connected to the switch 1 and have enhanced TCP/IP (Transfer Control Protocol/Internet Protocol) stacks permitting IETF Diffserv (Differentiated Services) or Intserv (Integrated Services) QoS mechanisms. These known mechanisms need not be discussed in detail here, but essentially provide for use of a signaling protocol such as RSVP (Resource Reservation Protocol) whereby the resources required for a communications session can be requested by hosts and reserved by network devices in the call path between the hosts as part of the session set-up procedure. Hosts X, Y and Z in this example are standard Ethernet hosts, hosts X and Y here being PCs on a shared Ethernet segment which communicate with printer Z using standard, best effort transmissions.

The control logic 5 of switch 1 is configured to support both the continuous media communications and the standard Ethernet transmissions, and to this end two service classes are defined in the control logic in this example, namely a "Resource Constrained" class and a "Normal" class. Traffic within VLANs associated with the Resource Constrained class is forwarded with high priority, transmissions for individual VLANS being scheduled as described further below Traffic within VLANs associated with the Normal class is forwarded with low priority, specifically according to a best effort system, such that traffic in the Resource Constrained class is always given precedence over Normal class traffic. Traffic corresponding to the two service classes is therefore effectively forwarded by the control logic in accordance with two priority queues, a high-priority queue 10 and a low-priority queue 11 as illustrated schematically in FIG. 2. Frames received from hosts in VLANs associated with the Resource Constrained class can be considered to be queued in the high-priority queue 10, and frames from hosts in VLANs associated with the Normal class can be considered to be queued in the low-priority queue 11, the control logic 5 selecting frames for forwarding in queuing order from the queue 10, and, if queue 10 is empty, in queuing order from the queue 11. It will be understood, however, that while it is convenient to consider the forwarding process in these terms, in practice frames are generally stored in queues at the input ports, transmitted via the switch fabric to queues at the outbound port, and then submitted to the individual MAC entity at the outbound port for onward transmission. Therefore the queues 10 and 11 here simply represent the order in which frames are processed by the control logic.

As discussed earlier, the sending and receiving hosts for a given data communication are assigned to a VLAN. In general, the VLANs may be preconfigured in the system, e.g. set up by a network operator using console input such as telnet or SNMP (Simple Network Management Protocol), or may be configured dynamically by network switches in known manner. Within the switch, each VLAN is associated with a service class which determines how that VLAN traffic is processed as discussed above. Considering the simple network of FIG. 2, suppose that control logic 5 receives a session request from Host A for a continuous media transmission to Host C. An example of the procedure performed by control logic 5 in this embodiment is illustrated in FIG. 3. The session request received by control logic 5 at step 15 identifies the participating hosts and the required resources, in particular the network bandwidth required for the session. The session data must be forwarded in accordance with the Resource Constrained service class, and the control logic, based on the rate at which the high-priority queue is serviced, can determine whether sufficient bandwidth is available. Assuming so, in step 16 the control logic 5 calculates a schedule indicating time periods for receiving session data from the participating hosts according to the bandwidth required. Next, in step 17 the control logic allocates a VLAN id for the session hosts (e.g. VLAN 1 for host set A and C), and records this in memory 6 against the service class to be applied for session transmissions. The association of VLAN ids with service classes may be stored for example in the form of a table as illustrated schematically in FIG. 4. The schedule calculated for the VLAN is also stored in memory 6 at step 17. Next, in step 18, the control logic sends the allocated VLAN id to the participating hosts, A and C, together with the calculated schedule, and the set-up process is complete.

In the above process for the network of FIG. 2, the set-up process is simplified since only a single switch is involved. However, if multiple switches lay in the call path between hosts A and C, then on receipt of the session request at step 15, the connection could be set up in known manner as indicated by step 16a of FIG. 3 via a signaling protocol such as RSVP discussed above. Here, all switches in the path reserve the necessary resources (if available), and acceptance of the call is signaled to the originating switch which then calculates its own schedule to fit with the global schedule as determined by downstream switches. In this case, the VLAN id allocated in step 17, together with VLAN membership and topology information can be communicated to network switches in known manner according to the dynamic VLAN configuration process.

Continuing with the FIG. 2 scenario, suppose that a further VLAN, VLAN Z is defined (either preconfigured or dynamically configured in response to a session request) for resource-constrained transmissions from Host B to Host C. The VLAN id is associated with the appropriate service class as indicated in FIG. 4, and a schedule is calculated for the session to fit with the schedule for VLAN 1 as indicated schematically in FIG. 5. A further VLAN, VLAN 0, is preconfigured in the system for standard Ethernet hosts X, Y and Z, and associated with the Normal priority class as indicated in FIG. 4. In operation, frames are received at the various switch ports, and the control logic 5 must determine how to deal with each frame. This forwarding procedure is illustrated by the flow chart of FIG. 6. On receipt of a frame at a switch port as indicated at step 20, the control logic 5 proceeds in step 21 to determine the VLAN id and the associated service class applicable to that frame. In the present scenario, Hosts A, B and C will "tag" frames sent to switch 1 by inserting the allocated VLAN id in the frame header. For these frames, the VLAN id is thus read directly from the frame header, and the appropriate service class is then indicated by the association table of FIG. 4. If the frames are not VLAN-tagged, then the control logic checks the source and destination hosts ids in the frame against the VLAN membership information stored in memory 6 to determine to determine the VLAN id for the set of source and destination hosts specified in the frame. In the present example, only hosts X, Y and Z transmit untagged frames and these hosts are assigned to VLAN 0. Thus, any frames received by the switch for transmission between these hosts are identified as VLAN 0 traffic, with "Normal" service class according to the association table. Next, in step 22 the control logic assigns the received frame to the appropriate priority queue 10 or 11 according to the forwarding requirements of the service class. The queued frame will then be selected for forwarding by the control logic via the appropriate outbound port, as indicated at step 23, in accordance with the order of servicing the two queues. Thus, VLAN 1 and 2 frames in queue 10 will be forwarded in queuing order, and at times when queue 10 is empty, frames in queue 11 will be forwarded in queuing order.

In the present embodiment, although transmission schedules have been assigned to VLAN 1 and 2 hosts, initially these hosts can send data outside their scheduled transmission times, taking advantage of any free capacity that might be available. However, this process (or excess traffic generated erroneously by a host if only scheduled transmissions are allowed) can lead to congestion in the switch as illustrated schematically in FIG. 7 where both queues are shown to be "full". (In this figure, a frame received from Host A on VLAN1, for example, is represented as $V1_{HOSTA}$). The prejudices the ability of the control logic to meet the forwarding requirements of the Resource Constrained service class, i.e. forwarding traffic received at the scheduled times from VLANs 1 and 2 at the forwarding rate of the high-priority queue. Thus, in operation, control logic 5 performs the monitoring process illustrated in FIG. 8. As indicated by steps 25 and 26 of this process, the control logic continually monitors the level of traffic congestion in the switch to determine if a high threshold level is reached. The congestion level could be assessed, for example, based on the availability of time slots on the bus of the switching fabric, or the volume of queued data in memory 6 (and specifically the level of occupancy of the various switch buffers). The high-congestion threshold could be set at the point at which forwarding of further resource constrained traffic is prejudiced, or may be set at some level below this critical point, for example when the buffers are 90% full, as desired. In any case, the high threshold is determined to ensure that the switch can process traffic received at the scheduled times from VLANs 1 and 2 at the required rate. When the control logic determines that the threshold has been reached at step 26, operation proceeds to step 27 where the control logic deactivates VLAN 1 and/or VLAN 2 outside their respective scheduled transmission times. Here, only the VLAN on which hosts are "misbehaving" by transmitting outside their schedule may be deactivated here, or both VLANs may simply be deactivated to enforce the schedules. Deactivation of a VLAN is implemented here simply by dropping frames sent by a host outside its scheduled times at the first switch port at which they are received. (Since in general services requiring QoS guarantees require timely arrival of information, it is preferable simply to drop such traffic rather than retry and eventually spend network resources transporting data that will ultimately be dropped, because out-of-date, by the recipient).

After implementing the enforcement of schedules at step 27 by periodic deactivation of VLANs, the control logic continues to monitor the congestion level in step 28 and to check (step 29) whether a low threshold level is reached. This threshold is set, based on the level of bus traffic or buffer occupancy as before, at a level at which it is deemed "safe" to lift the aid enforcement of schedules. When the low-congestion threshold is reached at step 29, in step 30 the control logic ceases deactivating VLANs outside the assigned schedules, and operation reverts to the initial mode with monitoring of the congestion level at step 25 as before.

It will be seen that the allocation of hosts participating in resource constrained communications to VLANs and the activation and deactivation of those VLANs as described above allows QoS to be guaranteed by the switch for the resource-constrained traffic. In this embodiment, VLAN 0 is used for standard, best effort traffic only, and is effectively a default VLAN provided to ensure back-compatability with standard Ethernet hosts. This VLAN need never be deactivated in the present embodiment, and normal CSMA/CD-enabled backflow is used to handle congestion for these hosts. These hosts therefore pay no price for the fact that the network supports guaranteed QoS, and require no modification.

While schedules calculated by the control logic are transmitted to hosts in VLANs 1 and 2 in the above embodiment, it will be appreciated that this is not essential. In particular, the schedules could simply be stored by the control logic and used as a basis for determining the time periods during which to deactivate one or other VLAN when necessary to reduce congestion levels as described above. Moreover, while a particular example of a system with one service class for resource constrained, scheduled transmissions, and another for best effort transmissions, has been described, it will be appreciated that many other service class systems can be implemented using similar principles to deactivate VLANs when required to support QoS guarantees. As one example, two or more different-priority service classes could be defined, corresponding to different priority queues in the forwarding process, such that traffic in each queue is given precedence over traffic in lower-priority queues. For example, all traffic in any given queue could be processed before any traffic in a lower-priority queue, or some form of thresholding may be incorporated in the priority system whereby a given queue will be preferentially serviced unless the amount of traffic in a lower queue reaches a certain threshold. In such cases, VLANs can be associated with priority classes according to the relative importance of the data to be communicated, and VLANs associated with one or more lower priority classes may be deactivated when required to ensure that queues for one or more higher priority-class VLANs can be serviced at a required rate. It will be apparent to those skilled in the art, however, that many other QoS mechanisms can be enforced using similar principles, and many further changes and modifications may be made to the embodiments described without departing from the scope of the invention.

We claim:

1. A method for managing data communications between hosts of a switched Ethernet network, the method comprising:
   a switch of said network dynamically assigning hosts to logical groups of hosts for a session in response to a session request such that the hosts participating in a data communication are assigned to the same group;
   said switch of the network, associating each said group with a service class indicative of requirements for forwarding data across the switch for data communications between hosts in the group during said session, and forwarding received data across the switch for each of a plurality of groups in a manner dependent on the service class of each group to which hosts participating in the data communication are assigned;
   in the switch, monitoring traffic congestion; and
   in the switch, disabling data communications between hosts in one or more of said plurality of groups when required based on said traffic congestion to satisfy the forwarding requirements for at least one said service class.

2. The method as claimed in claim 1 wherein data communications are disabled for a said group by discarding data received from any host in that group.

3. The method as claimed in claim 1 wherein the step of assigning hosts to a logical group comprises allocating a group identifier to hosts in that group.

4. The method as claimed in claim 1 wherein each said logical group comprises a VLAN, and wherein the step of assigning hosts to a logical group comprises allocating a VLAN identifier to hosts in that group.

5. The method as claimed in claim 3 wherein a group is associated with a service claim by storing data packets transmitted between hosts in that group.

6. The method as claimed in claim 3 including inserting the identifier allocated to a said group in data packets transmitted between hosts in that group.

7. The method as claimed in claim 6 wherein, for at least one said group, the identifier is inserted in data packets by hosts in that group.

8. The method as claimed in claim 6 wherein, for at least one said group, the identifier is inserted by the switch in data packets received from a host in that group.

9. The method as claimed in claim 1 wherein a high-priority service class and a low-priority service class are defined in the switch, whereby forwarding of received data from hosts in groups associated with the high-priority service class takes precedence over forwarding of received data from hosts in groups associated with the low-priority service class.

10. The method as claimed in claim 9 including, for at least one said group associated with the high-priority service class, calculating a transmission schedule in the switch indicating time periods for receiving data from hosts in the group such that the data received during said time periods will be forwarded by the switch in accordance with the high-priority service class, the schedule being calculated in dependence on the bandwidth required for data communications between hosts in the group.

11. The method as claimed in claim 10 including disabling data communications outside the scheduled time periods for the or each said group associated with the high-priority service class when required to satisfy the forwarding requirements of the high-priority service class.

12. The method as claimed in claim 10 including sending the transmission schedule calculated for a said group to the or each transmitting host in the group.

13. The method as claimed in claim 9 wherein the low-priority service class is defined in the switch for best-effort forwarding of received data.

14. The method as claimed in claim 13 including assigning all hosts participating in best-effort data communications to one said group associated with the low-priority service class.

15. The method as claimed in claim 1 wherein a plurality of different-priority service classes are defined in the switch, whereby forwarding of received data from hosts in groups associated with each of said different-priority service classes takes precedence over forwarding of received data from hosts in groups associated with any lower-priority service classes, the method including disabling data communications for groups associated with one or more low-priority service classes when required to satisfy the forwarding requirements of one or more higher-priority service classes.

16. A computer program element comprising computer program code means which, when loaded in a processor of a switch for connection in a switched Ethernet network, configures the processor to perform a method as claimed in claim 1.

17. A switch for connection in a switched Ethernet network, the switch comprising:
switching circuitry for forwarding across the switch of data received at a port of the switch;
assignment means for dynamically assigning hosts in the network to logical groups of hosts for a session in response to a session request;
memory for storing data indicative of an assignment of hosts in the network to logical groups of hosts, said assignment being such that the hosts participating in the data communication are assigned to the same group; and
control logic for associating each said group with a service class indicative of requirements for forwarding data across the switch for data communications between hosts in the group during the session, and for controlling forwarding of received data for each of a plurality of groups by the switching circuitry in a manner dependent on the service class of each group to which hosts participating in the data communication are assigned;
wherein the control logic is configured to disable data communications between hosts in one or more of said plurality of groups when required to satisfy the forwarding requirements for at least one said service class.

18. A switched Ethernet network comprising at least one switch as claimed in claim 17, and a plurality of hosts connected to ports of said at least one switch.

19. A computer program element comprising computer program code means which, when loaded in a processor of a switch for connection in a switched Ethernet network configures the processor to:
dynamically assign hosts of the network to logical groups of hosts for a session in response to a session request;
associate each said group with a service class indicative of requirements for forwarding data across the switch for data communications between hosts in the group during the session, and to control forwarding of received data across the switch for a plurality of groups in a manner dependent on the service class of each group to which hosts participating in the data communication are assigned; and
disable data communications between hosts in one or more of said plurality of groups when required to satisfy the forwarding requirements for at least one said service class.

* * * * *